United States Patent
Kokkinos

(10) Patent No.: US 7,561,798 B2
(45) Date of Patent: Jul. 14, 2009

(54) TESTING A FIBER LINK IN A COMMUNICATION SYSTEM WITHOUT INTERRUPTING SERVICE

(75) Inventor: Dimitrios S. Kokkinos, Flushing, NY (US)

(73) Assignee: Verizon Services Corp., Arlington, VA (US)

( * ) Notice: Subject to any disclaimer, the term of this patent is extended or adjusted under 35 U.S.C. 154(b) by 332 days.

(21) Appl. No.: 10/384,459

(22) Filed: Mar. 7, 2003

(65) Prior Publication Data

US 2004/0175171 A1    Sep. 9, 2004

(51) Int. Cl.
*H04B 10/08* (2006.01)
(52) U.S. Cl. .................... 398/31; 398/16; 398/38
(58) Field of Classification Search .................. 398/16, 398/30, 31, 32, 33, 42, 34, 35, 9, 38
See application file for complete search history.

(56) References Cited

U.S. PATENT DOCUMENTS

| | | | | | |
|---|---|---|---|---|---|
| 4,880,289 | A | * | 11/1989 | Imoto et al. | 398/42 |
| 5,077,729 | A | * | 12/1991 | Wong | 398/31 |
| 5,109,443 | A | * | 4/1992 | Hill et al. | 385/13 |
| 5,291,326 | A | * | 3/1994 | Heidemann | 398/33 |
| 6,005,694 | A | * | 12/1999 | Liu | 398/6 |
| 2002/0135840 | A1 | * | 9/2002 | Spagnoletti et al. | 359/128 |

* cited by examiner

*Primary Examiner*—Christina Y Leung

(57) ABSTRACT

There is provided a method for testing an optical fiber link. The method includes employing a wavelength division multiplexer (WDM) to receive a signal via a port of the WDM and multiplex the signal onto the optical fiber link. The signal is used in a test of the optical fiber link. There is also provided an arrangement of components for testing the fiber link.

14 Claims, 1 Drawing Sheet

TESTING A FIBER LINK IN A COMMUNICATION SYSTEM WITHOUT INTERRUPTING SERVICE

BACKGROUND OF THE INVENTION

1. Field of the Invention

The present invention relates to testing a fiber link, and more particularly, to a technique for testing a fiber link in a communication system without interrupting service in the communication system.

2. Description of the Related Art

For a high capacity fiber optic transport system such as a synchronous optical network (SONET) or a dense wave division multiplexing (DWDM) system, quality or condition of all elements of a fiber link between terminals is very important. These elements may include optical fiber, connectors, splices, attenuators and other optical components. Fiber link degradation due to poor performance of one or more elements could cause service interruption. The condition of the fiber link in service is also important when service is being upgraded to a higher speed, for example, by utilizing additional wavelengths, and it is also desired to make such an upgrade without service interruption.

Current methods for testing a fiber link are not performed while normal communication signals are routed through the fiber link. To test a fiber link that is being used for normal communication, the communication signal may be switched to another fiber link, designated as a protection path, but such switching causes at least a short service interruption. If there is no protection path, and therefore no fiber link to which the communication signal can be switched, then there will be a relatively long service interruption. The service interruption is necessary in order to access one or both ends of the fiber link under test.

An alarm is an indication that a signal has failed, or that an optical power level is below an acceptable threshold. Conventional optical transport systems provide information and alarms by monitoring the optical signal power level. However, in a case of signal degradation, monitoring of received optical signal power cannot identify a cause or a location of the signal degradation. Consequently, further analysis of the problem or sectionalization of the system would typically require service interruption. A service interruption is also typically required in order to definitively determine whether a fiber can handle a particular set of wavelengths.

Consequently, there is a need for a technique for testing a fiber link in a communication system without interrupting service in the system.

SUMMARY OF THE INVENTION

It is an object of the present invention to provide a technique for fiber link testing in a fiber optic transport system in which the testing does not interrupt service in the system.

It is another object of the present invention to provide such a technique in which the testing does not interfere with, or attenuate, normal communication signals on the fiber link.

It is a further object of the present invention to provide such a technique in which the testing can be performed bi-directionally on the fiber link.

These and other objects of the present invention are achieved by a method for testing an optical fiber link that includes employing a WDM to receive a signal via a port of the WDM and multiplex the signal onto the optical fiber link. The signal is used in a test of the optical fiber link.

Another method for testing an optical fiber link includes employing a WDM to couple a test signal between a first port of the WDM and the optical fiber link, and couple a communication signal between a second port of the WDM and the optical fiber link. The test signal is used in a test of the optical fiber link.

An arrangement for testing an optical fiber link includes a wavelength division multiplexer (WDM) for receiving a signal via a port of the WDM and multiplexing the signal onto the optical fiber link. The signal is used in a test of the optical fiber link.

Another arrangement for testing an optical fiber link includes a wavelength division multiplexer (WDM) for coupling a test signal between a first port of the WDM and the optical fiber link, and coupling a communication signal between a second port of the WDM and the optical fiber link. The test signal is used in a test of the optical fiber link.

DESCRIPTION OF THE INVENTION

Figure 1:
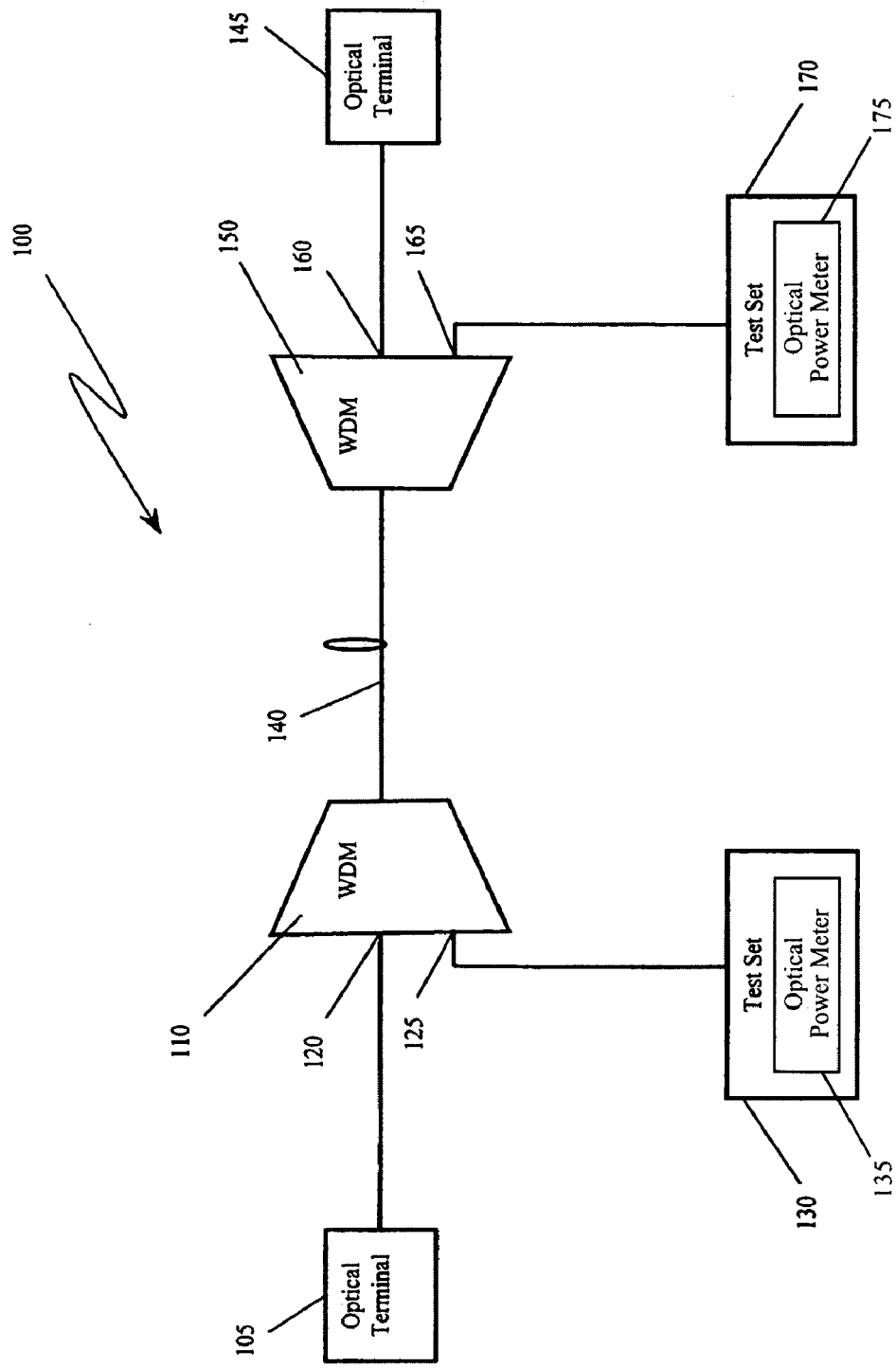
FIG. 1 is a block diagram of a fiber optic transport system configured for employment of the present invention.

A technique for testing a fiber link used in a wavelength division multiplexing system is to introduce and monitor a test signal on a spare channel of a wavelength division multiplexer (WDM). However, there are at least three drawbacks to this technique. (1) There must be a spare channel. (2) Specialized equipment (transmitter, receiver) is required to operate at a wavelength of the spare channel. (3) If an optical time domain reflectometry (OTDR) test is performed on the spare channel, it must be designed for operation at the wavelength of the spare channel, and a high power OTDR test signal will interfere with normal communication on adjacent working channels. Also, this technique cannot be used for SONET, because SONET provides for only a single optical channel, therefore there is no spare optical channel.

FIG. 1 is a block diagram of a communications system 100 configured for employment of a method for testing an optical fiber link as described herein. System 100 includes an arrangement of a first WDM 110 and a second WDM 150. WDMs 110 and 150 are coupled for communication therebetween over a fiber link 140. System 100 also includes a test set 130 and a test set 170.

WDM 110 includes a first port designated as test port 125, and a second port designated as communications port 120. WDM 110 receives optical signals at test port 125 and communications port 120, multiplexes the optical signals, and outputs the multiplexed signal to fiber link 140. Conversely, WDM 110 receives a multiplexed signal from fiber link 140, demultiplexes the signal, and outputs optical signals to test port 125 and communications port 120. Similarly, WDM 150 includes a first port designated as test port 165 and a second port designated as communications port 160 WDM 150 receives optical signals at test port 165 and communications port 160, multiplexes the optical signals, and outputs the multiplexed signal to fiber link 140: Conversely, WDM 150 receives a multiplexed signal from fiber link 140, demultiplexes the signal, and outputs optical signals to test port 165 and communications port 160. WDMs 110 and 150 can be configured with elements such as diffraction gratings, interference filters, splitters or combinations thereof.

An optical terminal 105 is coupled to communications port 120, and an optical terminal 145 is coupled to communications port 160. Thus, optical terminals 105 and 145 can communicate with one another via WDMs 110 and 150. Note that although WDMs 110 and 150 are shown as being external to optical terminals 105 and 145, they can be integrated into optical terminals 105 and 145.

WDMs 110 and 150 and test sets 130 and 170 are employed for testing fiber link 140. WDMs 110 and 150 are bi-directional devices, and therefore the testing can be performed bi-directionally. However, for purpose of example, assume that a signal is being transmitted from left to right in FIG. 1, that is from WDM 110 to WDM 150.

Test set 130 is coupled to, and provides a test signal to, test port 125. Test set 130 includes a laser source (not shown), which may be either fixed or tunable, to generate the test signal. Optionally, test set 130 may be an OTDR test set, in which case it will also detect a return of the test signal via test port 125. An OTDR test can be used to locate a problem on fiber link 140.

A communication signal is launched from optical terminal 105 into communications port 120. WDM 110 multiplexes the communication signal with the test signal from test set 130 to produce a multiplexed signal, which it launches to fiber link 140. WDM 150 receives and demultiplexes the multiplexed signal to recover the communication signal and the test signal. The communication signal is output via communications port 160, and the test signal is output via test port 165.

Test set 170 is coupled to test port 165. It includes an optical power meter 175 to measure optical power of the test signal. In practice, the optical power meter 175 should be calibrated to the wavelength of the test signal.

A window is a designation of a region of wavelengths that exhibit beneficial optical transmission properties. An optical communication channel can utilize a wavelength within the window. For instance, one window commonly used for optical transmission is called the 1500 nm window, and its associated region is centered at 1550 nm. Other windows are known as, for example, the 1300 nm window and the 1400 nm window.

A communication channel on fiber link 140 operates in a working window. The test signal applied via test port 125 is outside the working window. The test signal may be in another known window, or it may be introduced at a wavelength that is not a member of a known window.

WDMs 110 and 150 multiplex/demultiplex optical signals with spectra at different fiber optic windows, e.g., 1300, 1400, 1500, 1600 nm. Assume that the 1500 nm fiber optic window is used for SONET or DWDM communications signals with wavelengths centered around 1550 nm. The wavelength of the test signal belongs to another fiber optic window (e.g., 1300, 1400 or 1600 nm), referred to as a test window.

Note that WDM 110 can receive the communication signal via communications port 120 concurrently with a test of fiber link 140, i.e., concurrently with a receipt of the test signal via test port 125. Thus, the arrangement of WDM 110 in system 100 allows for testing of fiber link 140 without interrupting communications service through fiber link 140. For example, fiber link 140 can be tested with respect to operation in the test window without interrupting service in the 1500 nm window.

The wavelength of the test signal is selected by a tester based on a type of testing employed by the tester and a type of symptom that the tester wishes to detect. For example, a test for a loss induced by bending a fiber would yield different results depending on which fiber optic window is used. WDM 150 demultiplexes the 1500 nm window signals from the test window signal, and directs them to communications port 160 and test port 165, respectively.

Alternatively, assume that there is a communication channel operating in the 1300 nm window that we wish to move to the 1500 nm window. The test signal can be applied in the 1500 nm window to determine whether the 1500 nm window can support the communication channel.

WDMs 110 and 150 also allow for the test signal to travel between test ports 125 and 165 on fiber link 140, in either or both directions, with minimum attenuation and without interfering with communication signals. Note that test sets 130 and 170 may both include a laser source and an optical power meter 135 and 175. As such, each of test sets 130 and 170 could then provide a test signal and measure optical power of a test signal, and thus system 100 would provide for bi-directional testing of fiber link 140. Additionally, test sets 130 and 170 could be configured for testing OTDR, optical loss (OL) and optical return loss (ORL). Such testing allows for early detection and location of fiber link degradation when minor alarms are present as well as testing of important or suspicious active fiber links.

Optical power loss of fiber link 140 can be measured in any optical window, for example 1300, 1400, 1500 or 1600 nm or at a special wavelength. A particular wavelength may be advantageously selected to test for specific properties, such as, 1240 nm to test for molecular hydrogen contamination of submarine fiber cables, 1390 nm to test for OH detection also in submarine cables, and 1650 nm to test for fiber microbending or early detection of temperature induced cable loss (TICL). Also, a test signal can be applied for polarization mode dispersion (PMD) and chromatic dispersion measurements.

It should be understood that various alternatives and modifications of the present invention could be devised by those skilled in the art. Nevertheless, the present invention is intended to embrace all such alternatives, modifications and variances that fall within the scope of the appended claims.

What is claimed is:

1. A method for testing an optical fiber link, comprising:
   selecting a wavelength of a test signal based on a type of testing to be conducted and a type of symptom to be detected;
   generating a first test signal of the selected wavelength;
   employing a first wavelength division multiplexer (WDM) to receive said first test signal via a port of said first WDM prior to propagation along said optical fiber link and multiplex said first test signal onto said optical fiber link along with a communication signal, wherein said first test signal is used in a test of said optical fiber link;
   employing a second WDM spaced apart from said first WDM along the optical fiber link to demultiplex said first test signal from said optical fiber link and output said first test signal via a port of said second WDM;
   evaluating said first test signal output via the port of said second WDM and without further propagation along said optical fiber link to thereby test said optical fiber link;
   generating a second test signal of the selected wavelength;
   measuring optical power of said first and second test signals;
   employing the second WDM to receive said second test signal via a port of said second WDM prior to propagation along said optical fiber link and multiplex said second test signal onto said optical fiber link along with a communication signal;

employing the first WDM to demultiplex said second test signal from said optical fiber link and output said second test signal via a port of said first WDM; and evaluating said second test signal output via the port of said first WDM and without further propagation along said optical fiber link to thereby test said optical fiber link, wherein said first and second test signals are spaced apart from said communication signal by at least about 100 nm.

2. The method of claim 1, wherein said port is a first port, and wherein said first WDM receives the communication signal via a second port of said first WDM and multiplexes said communication signal onto said optical fiber link, concurrently with said test signal.

3. The method of claim 2, wherein said communication signal is selected from the group consisting of a synchronous optical network (SONET) signal, and a dense wave division multiplexing (DWDM) signal.

4. The method of claim 1 wherein said test is performed for a length of said optical fiber link between said first WDM and said second WDM.

5. The method of claim 1, wherein said test includes demultiplexing said test signal from said optical fiber link and measuring optical power of said demultiplexed signal.

6. The method of claim 1, wherein said test comprises determining a characteristic of said optical fiber link selected from the group consisting of optical time domain reflectometry (OTDR), optical loss (OL), optical return loss (ORL), fiber microbending, temperature induced cable loss (TICL), polarization mode dispersion (PMD), and chromatic dispersion.

7. An arrangement for testing an optical fiber link, comprising:

a first test set for generating a first test signal, wherein a wavelength of the first test signal is selected based on a type of testing to be conducted and a type of symptom to be detected;

a first wavelength division multiplexer (WDM) for receiving said first test signal via a port of said first WDM prior to propagation along said optical fiber link and multiplexing said first test signal onto said optical fiber link along with a communication signal, wherein said first test signal is used in a test of said optical fiber link, wherein said first test set is coupled to said port of said first WDM;

a second WDM spaced apart from said first WDM along the optical fiber link for demultiplexing said first test signal from said optical fiber link and outputting said first test signal via a port of said second WDM; and a second test set coupled to said port of said second WDM for evaluating said first test signal output via the port of said second WDM and without further propagation along said optical fiber link to thereby test said optical fiber link, wherein the second test set is also configured to generate a second test signal, wherein a wavelength of the second test signal is selected based on a type of testing to be conducted and a type of symptom to be detected, wherein the second WDM is configured to receive said second test signal via the port of said second WDM prior to propagation along said optical fiber link and multiplexing said second test signal onto said optical fiber link along with a communication signal, wherein the first WDM is configured to demultiplex said second test signal from said optical fiber link and to output said second test signal via the port of said first WDM, wherein said first test set is also configured to evaluate said second test signal output via the port of said first WDM, wherein said first and second test sets each include a first and second optical power meter, respectively, to each measure optical power of the first and second test signals, wherein said first and second test signals are spaced from said communication signal by at least about 100 nm.

8. The arrangement of claim 7, wherein said port is a first port, and wherein said first WDM is also for receiving the communication signal via a second port of said first WDM and multiplexing said communication signal onto said optical fiber link, concurrently with said test signal.

9. The arrangement of claim 8, wherein said communication signal is selected from the group consisting of a synchronous optical network (SONET) signal, and a dense wave division multiplexing (DWDM) signal.

10. The arrangement of claim 7 wherein said test is performed for a length of said optical fiber link between said first WDM and said second WDM.

11. The arrangement of claim 7, wherein said test includes demultiplexing said test signal from said optical fiber link and measuring optical power of said demultiplexed signal.

12. The arrangement of claim 7, wherein said test comprises determining a characteristic of said optical fiber link selected from the group consisting of optical time domain reflectometry (OTDR), optical loss (OL), optical return loss (ORL), fiber microbending, temperature induced cable loss (TICL), polarization mode dispersion (PMD), and chromatic dispersion.

13. A method for testing an optical fiber link, comprising:

selecting a wavelength of a test signal based on a type of testing to be conducted and a type of symptom to be detected;

generating a first test signal of the selected wavelength;

employing a first wavelength division multiplexer (WDM) to couple said first test signal between a first port of said first WDM and said optical fiber link prior to propagation of said first test signal along said optical fiber link, and to couple a communication signal between a second port of said first WDM and said optical fiber link, wherein said test signal is used in a test of said optical fiber link;

employing a second WDM spaced apart from said first WDM along the optical fiber link to demultiplex said first test signal from said optical fiber link and output said first test signal via a port of said second WDM;

evaluating said first test signal output via the port of said second WDM and without further propagation along said optical fiber link to thereby test said optical fiber link;

generating a second test signal of the selected wavelength;

measuring optical power of said first and second test signals;

employing the second WDM to receive said second test signal via a port of said second WDM prior to propagation along said optical fiber link and multiplex said second test signal onto said optical fiber link along with a communication signal;

employing the first WDM to demultiplex said second test signal from said optical fiber link and output said second test signal via a port of said first WDM; and evaluating said second test signal output via the port of said first WDM and without further propagation along said optical fiber link to thereby test said optical fiber link,
wherein said first and second test signals are spaced from said communication signal by at least about 100 nm.

14. An arrangement for testing an optical fiber link, comprising:
- a first test set for generating a first test signal, wherein a wavelength of the first test signal is selected based on a type of testing to be conducted and a type of symptom to be detected;
- a first wavelength division multiplexer (WDM) having a first port coupled to said first test set such that said first test signal is coupled between said first port of said first WDM and said optical fiber link prior to propagation of said first test signal along said optical fiber link, and coupling a communication signal between a second port of said first WDM and said optical fiber link, wherein said first test signal is used in a test of said optical fiber link;
- a second WDM spaced apart from said first WDM along the optical fiber link for demultiplexing said first test signal from said optical fiber link and outputting said test signal via a port of said second WDM; and
- a second test set coupled to said port of said second WDM for evaluating said first test signal output via the port of said second WDM and without further propagation along said optical fiber link to thereby test said optical fiber link, wherein the second test set is also configured to generate a second test signal, wherein a wavelength of the second test signal is selected based on a type of testing to be conducted and a type of symptom to be detected, wherein the second WDM is configured to receive said second test signal via the port of said second WDM prior to propagation along said optical fiber link and multiplexing said second test signal onto said optical fiber link along with a communication signal, wherein the first WDM is configured to demultiplex said second test signal from said optical fiber link and to output said second test signal via the first port of said first WDM, wherein said first test set is also configured to evaluate said second test signal output via the first port of said first WDM, wherein said first and second test sets each include a first and second optical power meter, respectively, to each measure optical power of the first and second test signals, wherein said first and second test signals are spaced from said communication signal by at least about 100 nm.

* * * * *